United States Patent [19]

Moller

[11] Patent Number: 4,719,565
[45] Date of Patent: Jan. 12, 1988

[54] INTERRUPT AND TRAP HANDLING IN MICROPROGRAM SEQUENCER

[75] Inventor: Ole H. Moller, Sunnyvale, Calif.

[73] Assignee: Advanced Micro Devices, Inc., Sunnyvale, Calif.

[21] Appl. No.: 667,242

[22] Filed: Nov. 1, 1984

[51] Int. Cl.$^4$ .............................................. G06F 13/32
[52] U.S. Cl. .................................................. 364/200
[58] Field of Search ... 364/900 MS File, 200 MS File

[56] References Cited

U.S. PATENT DOCUMENTS

| 4,074,353 | 2/1978 | Woods | 364/200 |
| 4,241,399 | 12/1980 | Strecker | 364/200 |
| 4,339,796 | 7/1982 | Breveton | 364/200 |
| 4,418,385 | 11/1983 | Bourrez | 364/200 |
| 4,438,492 | 3/1984 | Harmon | 364/900 |
| 4,589,065 | 5/1986 | Auslander | 364/200 |

Primary Examiner—Archie E. Williams, Jr.
Assistant Examiner—Emily Y. Chan
Attorney, Agent, or Firm—Patrick T. King; Kenneth B. Salomon; J. Vincent Tortolano

[57] ABSTRACT

A single-chip microprogram sequence controller can be selectively operated in either an interrupt mode or a trapped mode. In the interrupt mode, the miroprogram sequencer allows the currently-executing microinstruction to finish execution before beginning the interrupt routine which services the asynchronous event which requested the interruption of the presently-executing microinstruction stream. In the trap mode, the sequencer aborts the currently-executing microinstruction to avoid an irreversible error which would result if the microinstruction were to finish execution before beginning the routine which services the event which requested trapping of the presently-executing microinstruction. Depending on the mode selected, the sequencer stores the address on a last-in, first-out stack of either the next-following micro-instruction or the currently-executing microinstruction for return to the proper point in the microinstruction stream upon completion of the routine which requested the interrupt or the trap.

4 Claims, 5 Drawing Figures

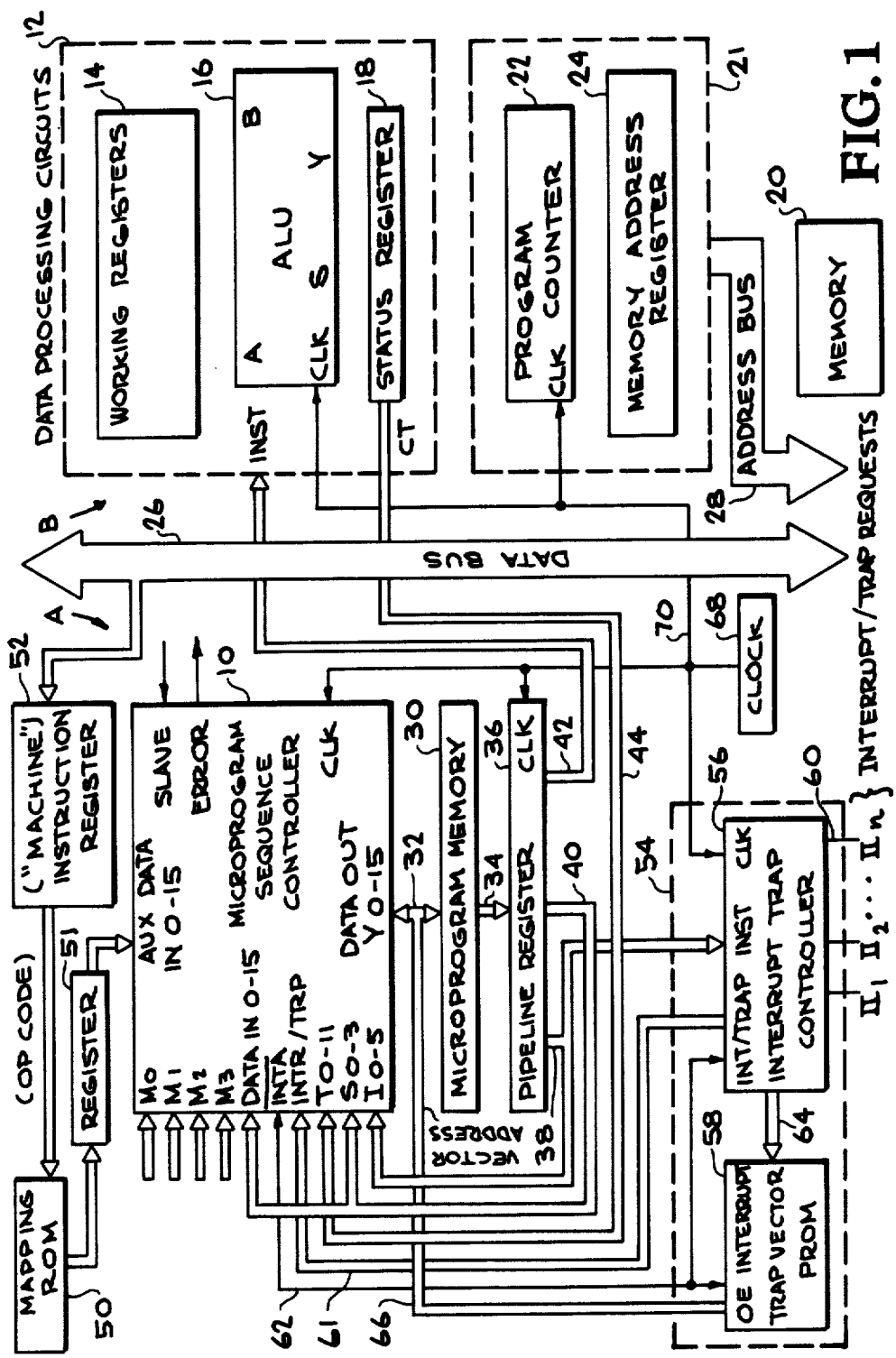

INTERRUPT AND TRAP HANDLING IN MICROPROGRAM SEQUENCER

CROSS REFERENCE TO RELATED APPLICATION

Related copending application of particular interest to this invention is U.S. patent application Ser. No. 608,319, filed May 8, 1984, on behalf of Ole Moller and Sanjay Iyer entitled "Interruptible Structured Microprogrammed 16-Bit Address Sequence Controller" and assigned to the assignee of the instant application.

This invention relates generally to a one-chip interruptible and trappable microprogram sequence controller for controlling the sequence of execution of microinstructions stored in a microprogram memory, and more particularly to a microprogram sequence controller having on-chip circuitry which affords user-selectable operation of the controller in either an interrupt-mode or a trap-mode.

BACKGROUND OF THE INVENTION

Typically, microprogrammed systems are constructed from a variety of very large scale integrated circuit (VLSI) chips used as building blocks in an architecture which can be divided into two subsections: a control section that supervises the order and decoding of instructions to be executed, and a data processing section which performs the operations called for by the instructions on the data. The control section normally includes a microprogram sequence controller that issues microprogram addresses, and a microprogram memory which contains microinstructions.

Each microinstruction includes a plurality of bits to control the element within the data processing section. In addition, the microinstruction may have a peripheral control portion comprising a plurality of bits communicated to an "intelligent" peripheral unit so that when called upon to receive or transmit data to the host microprogrammed system, the call requires a minimum of time and control by the host microcomputer. In peripheral controller operation, the microcomputer is often faced with the requirement for the efficient synchronization and response to asynchronous events such as power failure, machine malfunctions, control panel service requests, external timer signals, and input/output device service requests. Handling these asynchronous events, in terms of response time, systems throughput, hardware costs, and memory space required, is a true measure of the performance of the system.

One approach to handling asynchronous events is to incorporate circuitry that provides a status indicator associated with each possible asynchronous event. The microcomputer system then tests each indicator in sequence and, in effect, "asks" if service is required. This is typically referred to as the "polling" method and is often microprogram software implemented. This polling method, however, consumes time and microprogram memory space. System throughput is decreased, response time increased, and microprogram memory space that could otherwise be used for additional purposes dedicated to handling responses to these asynchronous events.

Asynchronous events can also be handled via what is termed an "interrupt" technique whereby the event generates a request signal. The microcomputer system, upon receipt of the request signal, may suspend the program it is presently executing, execute an event service routine, then resume execution of the suspended program. This method, at the additional expense of circuitry, is preferred, particularly in high performance operating systems. The microcomputer is not burdened with having to poll all status signals. Rather, a service routine is executed only when requested. Thus, the system is more efficient since response time is faster; and it is this low response time that is sought by the high performance data processing systems of today.

Yet, there still exists certain problems and disadvantages using the interrupt technique with today's available bipolar microcomputer systems. Presently, additional circuitry is necessary and the sequencer must be programmed to take the time to service the interrupt request circuitry itself. Furthermore, an interrupt technique is usually implemented so that before suspending the program presently executing, the microinstruction being executed at the time the interrupt request signal is received is allowed to be completed. The resulting newly-updated contents of all registers, the program counter, and certain other quantities are saved and then control is transferred to the appropriate interrupt event service routine.

However, certain asynchronous events are of such a nature that completion of the presently-executing microinstruction will cause irreversible error. For example, if the present microinstruction calls for writing a word to memory across a word boundary in a single cycle. To avoid such error, present microprogram sequence controllers must be specially equipped with a substantial amount of external logic circuitry to implement what is termed a "trap." Attendant to such circuitry is an increased chip count, chip costs, pin interconnection, space requirements, and inter-chip signal propagation delay.

SUMMARY OF THE INVENTION

The present invention is directed to a microprogram sequence controller having on-chip circuitry that permits both "interruption" and "trapping" of presently-executing instruction streams. In any given application, the particular method of handling an asynchronous event is readily chosen by the user by applying a particular set of external signals to the controller's terminal pins. The overall controller architecture is structured so that it can be fabricated as a single integrated circuit.

According to the present invention, a microprogram controller, used as an address sequencer intended for controlling the sequence of execution of microinstructions stored in a microprogram memory, is provided with circuitry that automatically allows the controller to abort execution of the presently-executing microinstruction and branch to a predetermined subroutine in response to a request for asynchronous event handling (hereinafter "trap"). The controller includes circuitry for generating sequential addresses that are applied to the microprogram memory for accessing a sequential set of microinstructions, a program address register that holds the generated address, a random access memory (RAM), a last-in, first-out stack, and interrupt/trap handling logic circuitry.

When an asynchronous event handling request is received, the interrupt/trap handling logic determines which mode is to be employed to service the request, i.e., by interrupting the present instruction stream following execution of the presently-executing microinstruction, or by trapping the presently-executing microinstruction stream and aborting the presently-executing microinstruction as selected by external signals. The logic circuitry will store the information presently extant in the controller to allow it to return to the proper point in the presently-executing stream, i.e., either the microinstruction next-following the one interrupted, or the microinstruction executing when it was trapped, after the subroutine has been completed which services the asynchronous event.

The interrupt/trap handling logic of the present invention can handle any level of nesting of interrupts/traps. For a fuller understanding of the nature and advantages of the invention, reference should be had to the ensuing detailed description taken in conjunction with the accompanying drawings.

BRIEF DESCRIPTION OF THE DRAWINGS

FIG. 1, illustrates a typical application of the trap handling microprogram sequence controller of the present invention in a microprocessor;

DESCRIPTION OF THE PREFERRED EMBODIMENT

A. General

Figure 2A:
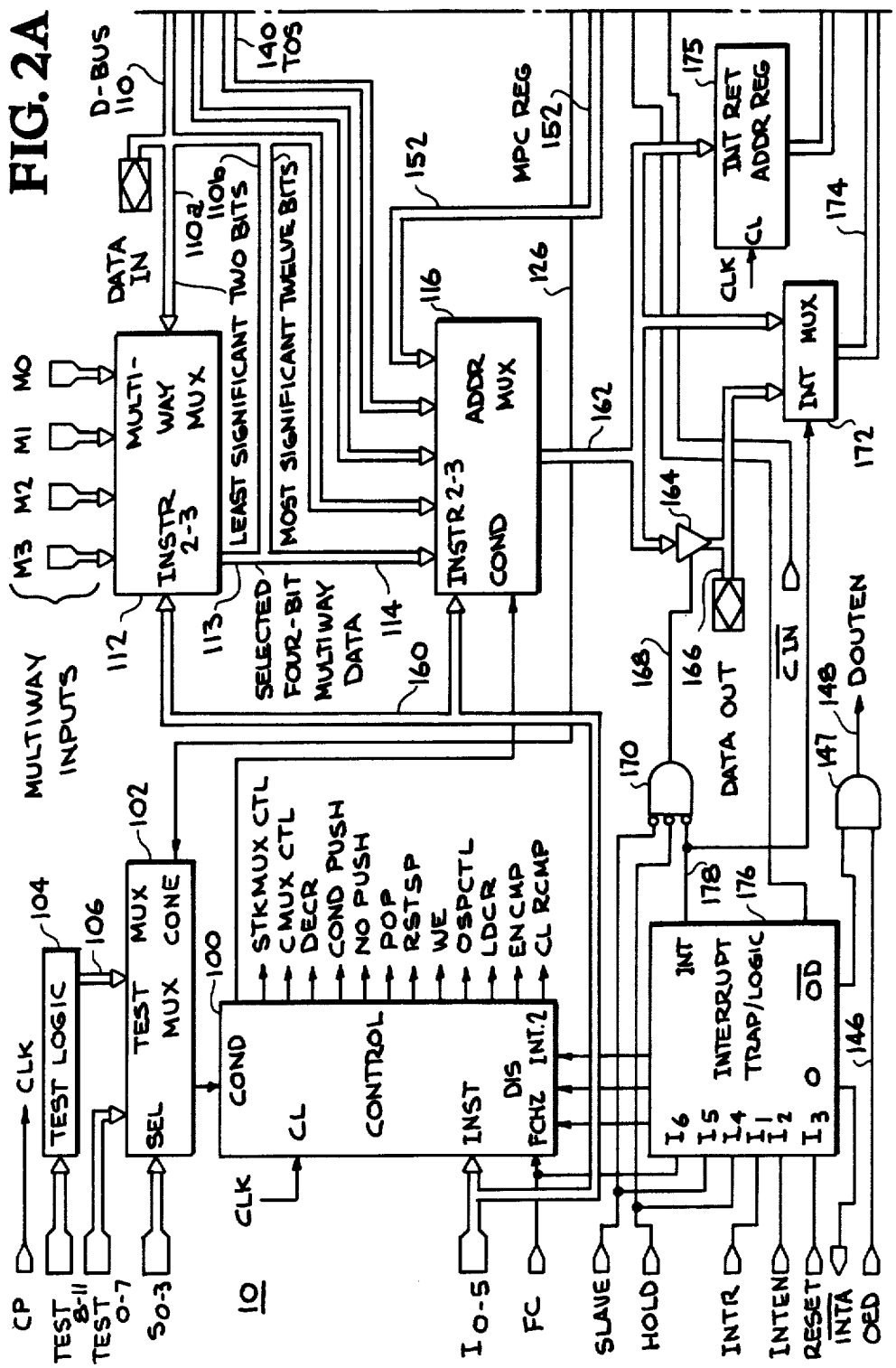
FIGS. 2A and 2B are functional block diagrams of the trap handling microprogram sequence controller of the present invention.

Many programmable digital devices today utilize microprogramming. In such devices, a large portion of the device's control is performed utilizing a read-only-memory (ROM) rather than large arrays of gates and flip-flops. This technique frequently reduces the package count in the digital device and provides a highly ordered structure, not present when random logic is used. Moreover, microprogramming makes changes in the device's instruction set very simple to perform, reducing post-production engineering costs for the device substantially.

FIG. 1 illustrates the typical microprocessor system architecture used in a programmable digital device and can be divided into two distinct sections: an instruction acquisition and processing section A on the left and a data acquisition and processing manipulation section B on the right. Section A has, as its heart, the microprogram sequence controller of the present invention, generally designated with the reference numeral 10. The data acquisition and manipulation section B includes the data processing circuits, generally designated as 12, which includes the working registers 14, the arithmetic logic unit (ALU) 16 and the status register 18. The data processing circuits process data acquired from memory 20 by performing whatever operations are required by the "machine" instruction pointed to by the data acquisition circuits, generally designated as 21, as addressed by program counter 22 and accessed via the memory address register 24. Each "machine" instruction is implemented on the microprocessor by a sequence of microinstructions selected by the microprogram sequence controller 10.

While, for the purposes of discussion, certain of the blocks shown in FIG. 1 are shown explicitly interconnected by designated lines, it is to be understood that data communication between any of the blocks shown can be effected along the bidirectional data bus 26. Similarly addresses can be communicated between any of the blocks shown, on address bus 28.

Microprogram sequence controller 10 generates addresses that determine the sequence of microinstructions that ultimately issue from the microprogram memory 30. The addresses generated by the microprogram sequence controller 10 are conducted from DATA—OUT terminals of controller 10 on a "Y" address bus 32 to the address circuits (not shown) of the microprogram memory 30. With the application of such microinstruction addresses, the microprogram memory 30 will issue, on the microinstructions, bus 34, microinstructions, usually of a word length on the order of 32 or more bits.

The microinstruction bus 34 conducts the microinstructions to the data inputs of a pipeline register 36, which accepts and temporarily holds the microinstruction. While the microinstruction is contained in pipeline register 36, output lines of the register go out to the various system elements, including a portion of the microinstruction which is returned to the sequencer controller to determine the address of the next microinstruction to be executed. That next address is computed by the microprogram sequence controller 10, conducted to the microprogram memory 30 via the "Y" address bus 32, and the next microinstruction sits at the input of the pipeline register 36.

Those portions of the microinstruction that are returned to the microprogram sequence controller 10 include a 6-bit controller instruction word, conducted on a controller instruction bus 38 and a multi-bit data word that is conducted on a controller data bus 40 to the data bus inputs of the sequence controller 10.

Other portions of the microinstruction are control signals which are conveyed to the data processing circuits 12 along processor instruction bus 42. These signals cause data to be transferred from memory 20 to the working register 14 and then processed by the arithmetic logic unit 16 and the result transferred to memory 20. During the processing of the data the processor may set certain bits in status register 18. The processor device can communicate this information to the microprogram sequence controller 10. For example, the status register 18 signals may be placed on the condition test (CT) output of the data processing circuits includes circuitry that can multiplex a plurality of condition test signals to the CT output. A detailed description of data processing circuits providing the functions herein described is supplied in "Bit-Slice Microprocessor Design" by John Mick and Jim Brick, McGraw-Hill, 1980 ISBN 0-07-041781-4.

The test signals appearing at the CT output of the data processing circuits 12 are applied to the TEST inputs of the microprogram controller 10, via the status signal lines 44, where, under control of the select inputs S0-S3, they are used to conditionally modify the address that will be presented to the microprogram memory 30.

Microinstruction "branch" addresses can be obtained from any one of five sources: first, from the controller data bus 40 to the DATA$_{13}$ IN inputs of the microprogram sequence controller, where it is used for microprogram addresses. A second possible source of microinstruction addresses is from a mapping read-only-memory (ROM) 50 which is connected via a microinstruction register 51 to the AUX—DATA—IN inputs of the microprogram sequence controller 10. These addresses are utilized by certain microinstructions as an alternative to the addresses on the DATA_IN inputs. The mapping ROM 50 typically contains the starting microroutine "branch" address and is itself addressed by the output of the instruction register 52. The instruction register 52, in turn, is provided with a "machine instruction" from memory 20 under the direction of program counter 22. The machine instruction is performed by executing several of the microinstructions (stored in the microprogram memory 30) in sequence.

The so-called four-bit "multiway" inputs M0, M1, M2 and M3 to microprogram sequence controller 10 are a third source of microinstruction branch addresses whereby certain microinstructions permit substitution of one of the four-bit patterns present at M0, M1, M2 or M3 for the least significant four bits at the DATA_IN inputs depending on the two least significant bit values on the DATA_IN inputs.

The fourth and fifth sources of microinstruction branch addresses are from registers internal to the controller 10; a return or loop address from the top of a stack register; or the next sequential address from the microprogram counter register.

The microprogram sequence controller 10 has an internal multiplexer which, under the direction of microinstructions, controls the selection of the particular one of the five sources of branch addresses.

In a typical application of the microprogram sequence controller, circuitry 54 for servicing asynchronous event handling requests would be included. For example, as shown in FIG. 1, an interrupt/trap controller 56 and in interrupt/trap vector PROM (IVP) 58. The interrupt/trap controller 56 would receive at its inputs (II$_1$, II$_2$, . . . , II$_n$), via corresponding signal lines 60, interrupt or trap signals from individual peripheral units, requesting some type of servicing (i.e., data transfers, reading switches, etc.). When an interrupt or trap signal is received at one of its II$_1$–II$_n$ inputs, the interrupt/trap controller 56 issues interrupt or trap request signals from its interrupt/trap (INT/TRAP) output, which are conducted to a set of interrupt/trap (INTR/TRP) inputs of the microprogram controller 10 via signal lines 61. As will be seen, the signals received by the microprogram sequence controller 10 at its INTR/TRP inputs may cause it to initiate a storage routine to store information presently contained in various registers of the controller 10 to enable it to return to the present microinstruction sequence at the proper place.

Following receipt of an accepted asynchronous event handling request, controller 10 generates an acknowledge interrupt/trap signal at output $\overline{INTA}$ which is sent via line 62 to IVP 58 and interrupt/trap controller 56, which formulates a multibit word identifying the particular unit requesting servicing. The formulated word is conducted on the signal lines 64 to the IVP 58. Each memory location of the IVP 58 contains an address of each sequence of microinstructions contained in the microprogram memory 30 needed for servicing the individual requests. Accordingly, the coded word generated by the interrupt/trap controller 56 and conducted on the signal lines 64 is applied to the address circuits of the IVP 58. In turn, the IVP communicates the address of the first microinstruction of the needed asynchronous event handling subroutine to the microprogram memory 30 via a vector address bus 66, which interconnects with the "Y" address bus 32 via tri-state buffering.

When the vector address communicated from the IVP 58 is applied to the microprogram memory 30, the microinstruction for the subroutine needed to handle the asynchronous event requesting servicing is loaded into the pipeline register 36. As with all microinstructions, portions of the microinstruction contained in the pipeline register 36 are returned via controller instruction bus 38 to microprogram sequence controller 10 to allow it to control the sequence of microinstructions of the asynchronous event subroutine. Furthermore, these microinstruction portions are transmitted via bus 38 to interrupt/trap controller 56 which uses them to generate internal control signals. When the asynchronous event has been serviced, a last microinstruction will cause the microprogram sequence controller to effect a return to the program sequence of address generation from which it "jumped."

Depending on the state of certain external signals applied to the INTR/TRP input terminals of the microprogram sequence controller 10, such as the interrupt enable (INTEN) signal, the trap request signal (INTR), the force continue (FC) signal, and the complemented carry-in ($\overline{C\_IN}$) to address incrementer signal, the return will be to the microinstruction next-following the microinstruction which was executing when the asynchronous event request was received, in the case of an interrupt, or for re-execution of the same microinstruction which was aborted when the asynchronous event request was received, in the case of a trap.

What may be termed a "machine" instruction is loaded into an instruction register 52. The contents of the instruction register 52 is applied to the mapping ROM 50 to, in turn, generate the address of the first microinstruction in microprogram memory 30 which must be executed to perform the required function (specified by the instruction held by the instruction register 52). A branch to this address occurs through the microprogram sequence controller 10. The machine instruction may call for several microinstructions to be executed such as, for example, fetching data from memory 20, performing arithmetic or logic operations within ALU 16, testing for overflow or other status indications and setting status register 18 accordingly, and so forth. Following completion of the microinstructions called for by the machine instruction, controller 10 will normally initiate an instruction fetch cycle. At this point, however, there may be branches to other sections of the microcode. For example, the microprocessor might receive an interrupt at one of the interrupt controller inputs 60 to obtain an interrupt service routine address from the IVP 58.

In order to effect synchronous operation of the microprocessor of FIG. 1, a system clock 68 is provided that generates clock pulses communicated on a clock line 70 to the individual elements of the microprocessor of FIG. 1.

Microprogram sequence controller 10 can be operated in a master/slave configuration with another sequence controller so that faults both of an internal and external nature can be detected. The two controllers are operated in parallel, one sequencer is designated as the master and operates normally as explained above. The second controller is put into slave mode by placing a HIGH signal on a SLAVE input and connecting all its outputs except an ERROR output to the corresponding outputs of the master controller. A HIGH signal on the ERROR output of the master controller indicates a malfunctioning external device such as a driver or bus contention. A HIGH signal on the ERROR output of the slave controller indicates an error at either one of the controllers.

B. The Interrupt/Trap Handling Microprogram Controller

While the interrupt/trap handling circuitry of the present invention will be described in relation to a microprogram sequence controller 10 having the specific internal architecture shown in FIG. 2, it is understood that the internal structure, the type of internal elements, the number of bits processed thereby, and so forth, may vary from implementation to implementation while still providing the various benefits of the invention.

The controller 10 shown in FIG. 2 is identical in all respects except as will be described hereinafter to the controller shown in FIG. 2 of the related copending U.S. patent application Ser. No. 608,319, filed May 8, 1984, on behalf of Ole Moller and Sanjay Iyer entitled "Interruptible Structured Microprogrammed 16-Bit Address Sequence Controller" and assigned to the assignee of the instant application, and is hereby incorporated by reference in the instant application. Except insofar as will be described hereinafter regarding the interrupt/trap handling aspects of the controller of the instant invention, a detailed description of the controller of the instant invention is supplied in the related copending application. The microinstruction set supported by the instant controller is identical in all relevant respects to the instruction set described in the related copending application.

Figure 2B:
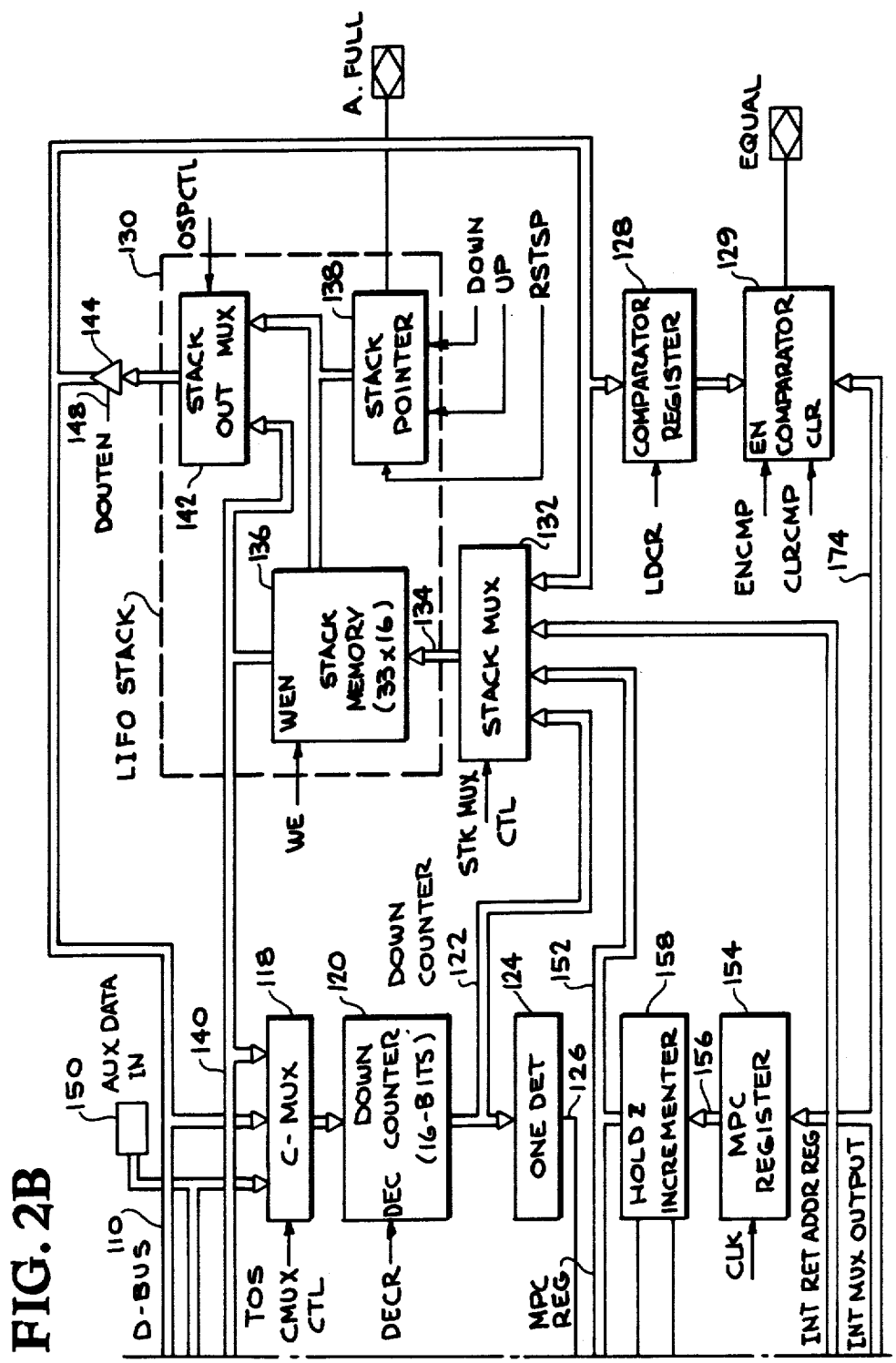

FIG. 2A of the instant application is identical in all respects with FIG. 2A of the related copending application, and the detailed description therein applies equally to FIG. 2A of the instant application in all respects, except for the provision of the set of input terminals, collectively denoted INTR/TRP in FIG. 1 of the instant application, including a force continue (FC) input to the controller 10, an interrupt enable (INTEN) input, an interrupt request (INTR) input and an interrupt acknowledge ($\overline{\text{INTA}}$) output connected to the interrupt logic circuit 176, renamed interrupt/trap logic circuit 176 in the instant FIG. 2A, the relative locations of the microprogram counter (MPC) register 154 and the incrementer 158, and the presence of signal lines communicating signals from the interrupt/trap logic circuit 176 to a disable (DIS) input of CONTROL 100 and to a hold Z (HOLD Z) input of incrementer 158, and for the presence of a signal line communicating a signal from a complemented carry-in ($\overline{\text{C\_IN}}$) input terminal of controller 10 to the incrementer 158. The $\overline{\text{C\_IN}}$ terminal is part of the set of input terminals denoted INTR/TRP on FIG. 1. (FIG. 2B of the instant application and FIG. 2B of the related copending application are identical in all respects, and the description therein applies equally to FIG. 2B of the instant application in all respects).

The microprogram sequence controller 10 of the instant invention can handle an asynchronous event if the controller is enabled to receive interrupts or configured to receive a trap and is not being reset or held, i.e. a HIGH is applied to an interrupt enable (INTEN) and an interrupt request (INTR) terminal of controller 10 and a LOW is applied to a RESET and a HOLD terminal. If a HIGH is applied to a force continue (FC) terminal and to a complemented carry-in to incrementer ($\overline{\text{C\_IN}}$) terminal then a trap can be received.

With reference to FIG. 2A of the instant application, an interrupt/trap logic circuit 176 receives at an input $I_1$, the signal received at the interrupt request (INTR) terminal of controller 10. Interrupt/trap logic circuit 176 ALU has communicated to a set of inputs $I_2$, $I_3$, $I_4$, $I_5$ and $I_6$ signals received at the five other input terminals of controller 10 mentioned above; the signal at the interrupt enable (INTEN) input terminal to input $I_2$, the signal at the reset (RESET) input terminal to input $I_3$, the signal at the HOLD input terminal to input $I_4$, the signal at the slave (SLAVE) input terminal to input $I_5$ and the signal at the force continue (FC) terminal to input $I_6$. An interrupt acknowledge ($\overline{\text{INTA}}$) output terminal of controller 10 is connected to an output (0) of the interrupt/trap logic circuit 176.

Figure 3A:
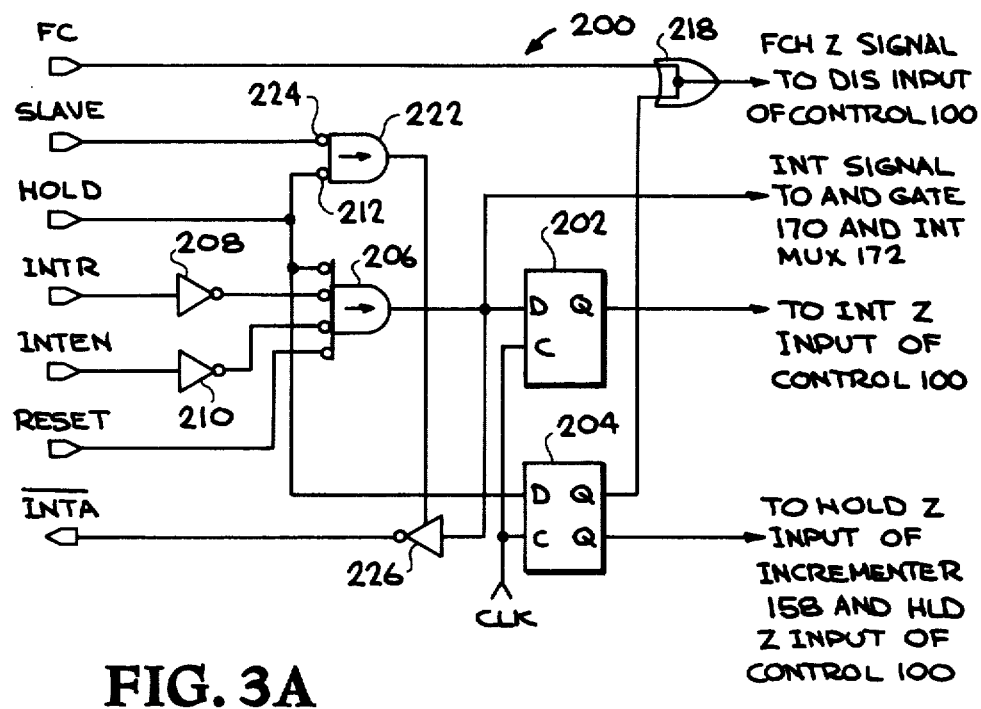
FIG. 3A is a diagram of the interrupt/trap detect circuit used in the interrupt/trap logic circuit of the invention of FIGS. 2A and 2B.

A signal representing the occurrence of a HIGH, at the FC or HOLD terminals of controller 10 is also conducted to a disable (DIS) input of combinational logic circuit (CONTROL) 100 which if HIGH, covers CONTROL 100 to generate signals which override the instruction word received at the INST inputs $I_{0-5}$ of CONTROL 100, as will be described below, in connection with FIG. 3.

In addition to the signal conducted to the disable (DIS) input, CONTROL 100 receives from the interrupt/trap logic circuit 176 signals conducted to a force continue or hold (FCH_Z) input and an interrupt processing (INT_Z) input. The CONTROL 100 also receives the signal at the FC terminal of controller 10. A complete description of those signals will be given in connection with the explanation of FIGS. 3A, 3B and 3C, below.

The function and meaning of the signals at the RESET, SLAVE, HOLD and $\overline{\text{INTA}}$ terminals of controller 10 are as described in the related copending application.

Unlike their descriptions in the related copending application of the microprogram sequence controller 10, the microprogram counter (MPC) register 154 of the instant invention contains the address of the currently-executed microinstruction, and the incrementer 158 contains the address of the currently-executed microinstruction plus one and is used to point to the next microinstruction to be executed if no branching is to be performed. The MPC register 154 receives the address at the output of interrupt multiplexer (INT MUX) 172 via signal lines 174. MPC register 154 also receives the clock pulse CLK at each clock cycle. The resulting contents is conducted along signal lines 156 from the MPC register 154 to the incrementer 158, providing the "current address plus one" to the ADDR MUX 116 and the STACK MUX 132 via signal lines 152. Incrementer 158 also receives the signal applied to the complemented carry-in ($\overline{\text{C\_IN}}$) terminal of controller 10. If the carry-in to the incrementer $\overline{\text{C\_IN}}$ is a HIGH, the incrementer 158 is inhibited and the address received from MPC register 154 on signal lines 156 is conducted unchanged onto the signal lines 152, if the $\overline{\text{C\_IN}}$ is a LOW, the incrementer 158 adds one to the address received from the MPC register before it is placed onto the signal lines 152.

Referring again to FIG. 2A of the instant application, the sixteen signal lines 162 forming the output of ADDR MUX 116 are communicated to a set (of sixteen) three-state output drivers 164. The drivers 164 place the 16-bit branch address determined by microprogram sequence controller 10 onto a three-state, bidirectional Y-bus 166 provided to receive, conduct and transmit the data signals to the DATA_OUT terminals of controller 10. The three-state output drivers 164 are enabled by a HIGH received on a signal line 168. Signal line 168 is the output of an NOR gate 170 which is controlled by signals received at a SLAVE input, a HOLD input terminal of microprogram sequence controller 10, and a signal (INT) generated by an interrupt logic circuit 176. When these three signals are LOW, NOR gate 170 sets line 168 HIGH and the outputs of three-state drivers 164 are enabled. The address signals on lines 162 may then be applied to Y-bus 166 and presented to the DATA_OUT terminals of controller 10.

When the signal on line 168 to three-state output drivers 164 is a LOW, the outputs of the three-state output drivers are in the high impedance state and an address signal may then be applied to the "Y" address bus 32 (FIG. 1) by the IVP 58 (FIG. 1) to select the next microinstruction, as will be described below.

Address signal lines 162 are also coupled to an interrupt multiplexer (INT MUX) 172 which can conduct branch addresses present on Y-bus 166 to MPC register 154 and comparator 129 via signal lines 174. Furthermore, the DATA_OUT terminals can receive an interrupt address and conduct it along Y-bus 166 to an interrupt multiplexer (INT MUX) 172, as will be described below. An interrupt return address register (INT RET ADDR REG) 175 is used to temporarily hold the return address of the interrupted or trapped microprogram when an interrupt or trap request is received by the microprogram sequence controller 10.

C. Interrupt Handling

In all other respects, the structure and operation of the microprogram sequence controller 10 as shown in FIG. 2A of the instant application is essentially identical to the structure and operation of the microprogram sequence controller 10 as shown in FIG. 2A of the related copending application, as it relates to the handling of interrupts. To reiterate briefly, when there is no interrupt or trap request supplied to sequence controller 10 and it is not being operated in the slave mode and not being held, branch addresses are conducted from ADDR MUX output lines 162 to the DATA_OUT terminals via Y-bus 166 and three-state output drivers 164. Furthermore, under these conditions, interrupt/trap logic circuit 176 codes the received inputs and generates interrupt signal (INT) communicated to INT MUX 172 on line 178 so that the branch addresses input to INT MUX 172 are passed along signal lines 174 to the MPC register 154 and comparator 129.

When an interrupt is to be processed by microprogram sequence controller 10, the current microinstruction can safely be permitted to finish execution. At the start of the next controller clock cycle, however, INTEN is HIGH, RESET and HOLD are LOW and interrupt/trap logic circuit 176 causes an interrupt (INT) signal to change from LOW to HIGH and this HIGH signal is communicated via line 178 to INT MUX 172 which disables the address communication path from the ADDR MUX 116 to MPC register 154 and comparator 129 via Y-bus 166 and signal lines 174. Furthermore, Y-bus three-state output drivers 164 are disabled by virtue of NOR gate 170 sending a LOW signal along line 168 to drivers 164, in response to the HIGH INT signal generated by interrupt/trap logic circuit 176. The Y-bus 166, in addition to conducting the outputs of the three-state output drivers 164 to the DATA_OUT terminals, is also connected to an input to the INT MUX 172 which, as mentioned earlier, has its output connected via signal line 174 to the MPC register 154 and therefrom via signal lines 156 to the incrementer 158 which increments the address supplied by the IVP 58.

Accordingly, presence of the HIGH INT signal on line 178 causes INT MUX 172 to select the input receiving the signals on the bidirectional Y-bus 166 from the DATA_OUT terminals of controller 10, namely the interrupt address. This interrupt address is then conducted via the output signal lines 174 of the INT MUX 172 to the MPC register 154 and the comparator 129. The address from the ADDR MUX 116 is saved by storing it in the interrupt return address register 175 and during the next clock cycle pushed onto the LIFO stack 130. The interrupt routine causes the content of certain of the registers to be stored in the LIFO STACK 130, which can be retrieved later. The information stored provides an address linkage return to the microinstruction sequence that the microprogram sequence controller 10 was in when it received an interrupt request. Since this return address is saved on the LIFO STACK 130, nested interrupts can be handled by a mioroprogram sequence controller 10 constructed according to the teaching of the instant invention.

In order to ensure that all information needed to establish the linkage back to the sequence interrupted, yet proceed with the branching and executing of the interrupt subroutine to which the branch occurs, all information is stored in one clock period. Accordingly, certain of the information is temporarily stored in the INT RET ADDR REG 175 which is then communicated to the LIFO stack 130 via the STACK MUX 132. The INT RET ADD REG 175 receives the clock (CLK), provided at and communicated from the CP input terminal, at its clock (CL) input. Information is stored in the interrupt return address register 175 every clock (instruction) cycle; but the stored information is used only when an interrupt signal is received.

D. Trap Handling

When the microprogram sequence controller 10 is enabled to detect traps, at the occurrence of a trapped event the current microinstruction must be aborted before the end of the current controller clock cycle and re-executed after the execution of a trap routine, which is designed to take intervening corrective measures. As soon as the controller 10 receives those inputs signalling the occurrence of an event to be trapped i.e., INTEN, INTR, FC and $\overline{C\_IN}$ are HIGH, interrupt/trap logic circuit 176 immediately causes the interrupt (INT) signal to change from LOW to HIGH and this HIGH signal is communicated via line 178 to INT MUX 172 which, as in the case of an interrupt, disables the address communication path from the ADDR MUX 116 to the MPC register 154 and comparator 129 via Y-bus 166 and signal lines 174. Furthermore, Y-bus three-state output drivers 164 are disabled by virtue of NOR gate 170 sending a LOW signal along line 168 to drivers 164, in response to the HIGH INT signal generated by interrupt/logic circuit 176.

Accordingly, presence of the HIGH INT signal on line 178 causes INT MUX 172 to select the input receiving the signals on the bidirectional Y-bus 166 from the DATA_OUT terminals of controller 10, namely the address of the trap routine. This trap address is then conducted via the output signal lines 174 of the INT MUX 172 to the MPC register 154 (and the comparator 129).

Due to the relative positions of the incrementer 158 and the MPC register 154 within the controller 10, the address present at the output of the incrementer 158, which is the trap return address, i.e., the address of the aborted microinstruction, is available to be conducted via signal lines 152 to the ADDR MUX 116 and saved by storing it in the INT RET ADDR REG 175 (and during the next clock cycle) pushed onto the LIFO STACK 130, at the same time that the trap address is being stored in the MPC register 154, as described above.

Since the $\overline{C\_IN}$ signal received at the incrementer 158 is a HIGH, the trap address received by the incrementer via signal lines 156 will be conducted unchanged via the signal lines 152 to the ADDR MUX 116. Due to the fact that the FC signal input to the microprogram sequence controller 10 is a HIGH, a HIGH signal is generated by interrupt/trap logic circuit 176 and conducted to the DIS input of the CONTROL 100. CONTROL 100 then generates a signal communicated to the COND input of ADDR MUX 116, which causes ADDR MUX 116 to conduct the trap return address to its output lines 162. Whereupon the address of the currently-executed microinstruction is replaced on the Y-bus 166 by the address of the first microinstruction of the trap routine. Since this currently-executed microinstruction did not complete execution, due to the HIGH FC signal, the contents of the registers within the microprogram sequencer 10 were not updated and thus upon return from the trap routine, the instruction can be re-executed without further action. The handling of the trap by the microprogram sequence controller 10 therefore can proceed beyond this point as described above for an interrupt.

E. The Interrupt/Trap Detection Circuit

The signals received by microprogram sequence controller 10 at its interrupt request (INTR) and interrupt enable (INTEN) terminals are conducted to the interrupt/trap logic circuit 176 at its $I_1$, $I_2$ inputs, respectively. These signals are latched by the interrupt/trap detect circuit 200 illustrated in FIG. 3A. As shown, a pair of flip-flops 202, 204 receive on their clock (C) inputs the CLK signal. The flip-flop 202 receives at its data (D) input the interrupt signal (INT) generated by a NOR gate 206 which, in turn, receives the INTR, INTEN, terminals via inverters 208 and 210 and the signals conducted from the controller HOLD and RESET terminals, each at a complemented input of gate 206. Accordingly, the true (Q) output of flip-flop 202 is the logical AND of the signal at the INTR terminal and the signal at the INTEN terminal from the preceding clock cycle, if the microprogram sequence controller 10 is not being held or reset. This Q output signal (INT_Z) is received at the complemented input to an AND gate 216.

In similar fashion, the data (D) input of the flip-flop 204 receives the signal on the signal line conducting the signal from the HOLD terminal of controller 10. The signal at a first true (Q) output of flip-flop 204 is received at an input to a wired-OR gate 218. The signal at a second true (Q) output of flip-flop 204 forms the HOLD_Z signal output from interrupt/trap detect circuit 200. Gate 218 also receives at a second input the signal conducted from the controller 10 force continue (FC) terminal. Since the signal at the HOLD terminal is latched by flip-flop 204, the output of the wired-OR gate 218, force continue hold (FCH_Z) will follow the present state of the FC terminal during any clock cycle when the microprogram sequence controller 10 is not being held. Accordingly, the output signal FCH_Z is applied to the disable (DIS) input of CONTROL 100 which causes the currently-applied microinstruction bits $I_{0-5}$ to be ignored and causes all output signals generated by CONTROL 100 to be inactive, other than causing a CMUXCTL to be generated which deselects any of the inputs to the CMUX 118 on lines 110, 140 or 150 from the DATA_IN, TOS, AUX_DATA_IN sources, respectively, and causing a COND signal to be generated which causes the ADDR MUX 116 to select the inputs on lines 152 from the incrementer 158 to be placed on the output of the ADDR MUX 116 and conducted via signal lines 162 to the INT RET ADDR REG 175.

The signal INT generated at the output of NOR gate 206 is conducted via signal line 178 to an input of the NOR gate 170, which in turn generates a signal on line 168 causing the set of sixteen three-state output drivers 164 to achieve the high impedance state. This disconnects Y-bus 166 from ADDR MUX output lines 162. The INT signal is also conducted to the INT MUX 172 where it causes the interrupt/trap address placed on the Y-bus 166 by the IVP 58 to be conducted to the MPC REGISTER 154 via signal lines 174.

Interrupt/trap detection circuit 200 includes a NOR gate 222 which receives at inputs the signal on the SLAVE and HOLD terminals of controller 10 via inverters 224 and 212; respectively. The output of NOR gate 222 is connected to inverting the enable input of a three-state buffer 226. The output of NOR gate 206, the INT signal, is passed through the inverting buffer 226 to become the $\overline{INTA}$ signal that enables (via its OE input) the IVP 58 (FIG. 1).

Figure 3B:
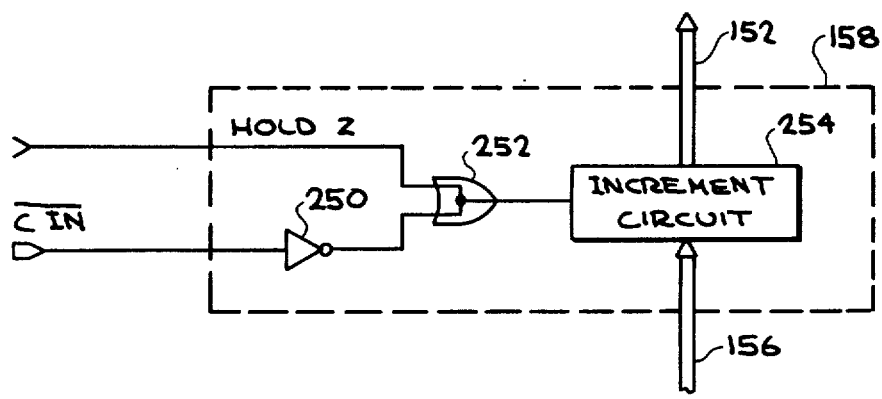
FIG. 3B, is a diagram of the carry-in to incrementer circuit used in the incrementer of the invention of FIGS. 2A and 2B.

Accordingly, if the currently-executing microinstruction is "trapped," the address of the currently-executing microinstruction is saved in the INT RET ADDR REG 175, as follows: during a trap the incrementer 158 receives a HIGH signal from the $\overline{C\_IN}$ terminal of controller to which, as shown in FIG. 3B, is conducted via an inverter 250 to an input of a wired-OR gate 252. The HOLD_Z signal generated by the flip-flop 204 is conducted to a second input of the wired-OR gate 252. The HOLD-Z signal is a LOW since the controller 10 is, by assumption, not being held, both inputs to wired-OR gate 252 are LOW and the resulting LOW output is received by increment circuit 254 which causes incrementer 158 to pass the address of the currently-executing microinstruction received on signal lines 156 unincremented, i.e. the trap return address, onto signal lines 152 where it is selected by ADDR MUX 116 to be passed to the INT RET ADDR REG 175.

At the same time, INT MUX 172 receives the address of the first instruction of the trap routine and passes it to the input of the MPC register 154 via lines 174. At the next clock cycle, this address is received by the incrementer 158 on signal lines 156 and since a LOW carry-in $\overline{C\_IN}$ signal is now received by the incrementer 158, the address of the instruction next-following the first instruction of the trap routine is presented to the ADDR MUX 116 via bus 152. Since the trap return address is present at the output of the INT RET ADDR REG 172 it is pushed onto the LIFO STACK 130 by the first instruction of the trap routine, and accordingly this first instruction may not use the LIFO STACK 130.

The final instruction of the trap routine will pop this trap address from the LIFO STACK 130 and since it was not incremented prior to its push onto the stack, as mentioned, the microprogram sequence controller 10 will issue the trap return address on the DATA_OUT terminal 166 upon return from the trap routine and accordingly the trapped microinstruction will be re-issued following execution of the trap routine. As mentioned above, since trap return addresses are pushed onto the LIFO STACK 130, traps may be nested.

As mentioned above, since the FC terminal of the controller 10 is tied HIGH during a trap, the outputs of the CONTROL 100, other than the CMUXCTL signal and the COND signal previously described, are inactive and the currently-executing microinstruction bits $I_{0-5}$ are ignored for the duration of the present controller clock cycle. Thus, other than the actions just described regarding the storage of the trap return address in the INT RET ADDR REG 175 and the storage of the address of the trap routine in the MPC register 154, the trapped instruction is aborted.

Alternatively, if the currently-executing microinstruction is "interrupted," i.e. the FC terminal of controller 10 is LOW, the presently-executing microinstruction will complete execution since the FCH_Z signal output from the wired-OR gate 218 is LOW throughout the remainder of the controller's present clock cycle. Hence the CONTROL 100 will proceed to generate all the signals it normally would. However, during the present clock cycle, the NOR gate 206, at the time the interrupt is activated, will pass the signal from the INTR terminal of controller 10 and the resulting signal INT will be conducted on signal line 178 to the NOR gate 170 which will cause the three-state output drivers 164 to disconnect the Y-bus 166 from the ADDR MUX 116 output lines 162 and the INT MUX 172 causes the interrupt address to be conducted to the MPC register 154 as mentioned above.

Accordingly, the address of the currently-executing microinstruction is saved in the INT RET ADDR REG 175 since during an interrupt the $\overline{C\_IN}$ terminal is HIGH and thus the incrementer 158 passes the address of the currently-executing microinstruction received on signal lines 156 onto signal lines 154 where it is selected by the ADDR MUX 116 to be passed to the INT RET ADDR REG 175. At the same time, INT MUX 172 receives the address of the first instruction of the interrupt routine and passes it to the input of the MPC register 154 via lines 174. At the next clock cycle, this address is received by the incrementer 158 and incremented as explained above in connection with the trap-handling by controller 10. Similarly, the final instruction of the interrupt routine will pop this interrupt return address from the LIFO STACK 130, the microprogram sequence controller 10 will issue the interrupt return address on the DATA_OUT terminals 166 upon return from the interrupt routine and accordingly the microinstruction next following the interrupted microinstruction will be executed following completion of the interrupt routine. As mentioned above, since interrupt return addresses are pushed onto the LIFO stack 130, interrupts may be nested.

I claim:

1. In a microprogram sequence controller which generates instruction addresses on a bidirectional output data bus, including instruction decoding means for generating a plurality of control signals, and last-in, first-out memory means connected to said instruction decoding means and responsive to said control signals for receiving and storing a plurality of instruction addresses, said microprogram sequence controller responsive to signals indicative of operation in an interrupt mode or a trap mode and further including instruction address counter means responsive to interrupt- and trap-mode signals for receiving and instruction address, for selectively incrementing, for storing said address, and for generating said instruction address at an output and interrupt/trap means connected to said intruction decoding means and to said intruction address counter means for receiving said signals indicative of operation in said interrupt-mode said trap-mode and an instruction address, and for generating said interrupt- and said trap-mode signals a method of selectively operating said microprogram sequence controller in an interrupt-mode or a trap-mode comprising upon receipt by said interrupt/trap means of said signal indicating operation in said interrupt-mode, the steps;

(a) incrementing said instruction address received by said address counter means, (b) inhibiting generation by said instruction counter means of said instruction address ("interrupt return address") on said bidirectional output data bus, (c) storing said interrupt return address in said last-in, first-out memory means, (d) receiving on said bidirectional output data bus an address of a first instruction of an interrupt subroutine ("interrupt address"), and (e) storing said interrupt address in said address counter means, upon receipt by said interrupt/trap means of said signal indication operation in said trap-mode, the steps;

(f) inhibiting incrementation of said instruction address by said address counter means, (g) inhibiting generation by said address counter means of an instruction address ("trap return address") on said bidirectional output data bus, (h) storing said trap return address in said last-in, first-out memory means, (i) receiving on said bidirectional output data bus an address of a first instruction of a trap subroutine ("trap address"), and (j) storing said trap address in said address counter means.

2. A microprogram sequence controller responsive to an interrupt signal and a trap signal having tri-state bidirecrtional output means responsive to an inhibit signal for receiving microinstruction address signals from an interrupt/trap memory element and generating through said output means microinstruction address signals used to access a program memory element containing a plurality of microinstructions, there being a first register means connected to said memory element for receiving and temporarily holding microinstructions accessed from said memory element by said microinstruction address signals and bus means for communicating a portion of said accessed microinstruction from said first register means to said microprogram sequence controller, said microprogram sequence controller comprising:

input means connected to said bus means for receiving instruction words and data words;

decode means connected to said input means for receiving said instruction words to generate therefrom a plurality of control signals;

first address generating means, responsive to an enable signal, having second register means and incrementing means operably interconnected to provide sequentially incremented address signals;

last-in, first-out (LIFO) storage means responsive to said control signals and to gating signals for selectively storing address signals;

first multiplex means, having an output terminal at which said microinstruction address signals are generated, connected to said output means, responsive to said control signals, connected to said input means, said first address generating means and said storage means, for selectively coupling said input means, said first address generating means, and said storage means to said output terminal in response to said control signals, said first address generating means and said LIFO storage means further connected to said first multiplex output terminal means for receiving signals therefrom in response to said control signals; and interrupt/trap means for receiving said interrupt signal and for generating therefrom said gating signals that generate said incrementing means enable signal, that generate said inhibit signal disabling communication of the sequential address ("interrupt return address") signals generated by said first multiplex means to said output means, for generating said gating signals that cause to be stored said next sequential address signals in said (LIFO) storage means, said interrupt/trap means further for receiving said trap signal and for generating therefrom gating signals that suppress said incrementing means enable signal, that generate said inhibit signal disabling communication of the address signals, ("trap return address") applied to said output means generated by said address generating means, for generating said gating signals that cause to be stored said trap return address in said LIFO storage means, and means for generating at said output means said "interrupt" and "trap" address signals and for communicating said "interrupt" and "trap" address signals to said memory element in response to said interrupt and trap signals, respectively.

3. The microprogram sequence controller of claim 2, wherein said first address generating means includes second multiplex means responsive to said gating signals, connected to said output terminal of said first multiplex means and to said output means, said second multiplex means for selectively coupling said first multiplex means output terminal or said output means to said LIFO storage means and to said first address generating means, in response to said gating signal; and latch means connected between said output means and said LIFO storage means for receiving and temporarily holding said interrupt return address signals to provide said interrupt return address to said LIFO storage means.

4. The microprogram sequence controller of claim 3, wherein said microprogram controller is further responsive to a clock signal and a carry-in signal; and wherein said second register means further includes means for receiving said clock signal and means responsive to said clock signal for receiving and temporarily storing for one clock cycle said address signals; and wherein said incrementing means in connected to said interrupt/trap means and further includes means responsive to said carry-in signal for inhibiting during the next-following clock cycle application of the sequential address to said output means and for incrementing, not incrementing, the sequential address signals upon reception by said interrupt/trap means of said interrupt signal, said trap signal, respectively, and for storing the sequential address signals applied to said second register means.

* * * * *